United States Patent
Di Nicolantonio et al.

(10) Patent No.: US 7,794,184 B2
(45) Date of Patent: Sep. 14, 2010

(54) DUST CATCHER

(75) Inventors: Aldo Di Nicolantonio, Recherswil (CH); Daniel Iranyi, Steinhausen (CH)

(73) Assignee: Robert Bosch GmbH, Stuttgart (DE)

( * ) Notice: Subject to any disclaimer, the term of this patent is extended or adjusted under 35 U.S.C. 154(b) by 308 days.

(21) Appl. No.: 11/434,465

(22) Filed: May 15, 2006

(65) Prior Publication Data
US 2006/0272123 A1    Dec. 7, 2006

(30) Foreign Application Priority Data
May 19, 2005   (DE) ................. 10 2005 023 186

(51) Int. Cl.
*B23B 47/34*    (2006.01)
(52) U.S. Cl. ........................... 408/67; 408/110
(58) Field of Classification Search ............. 408/67, 408/110–112, 16; 175/209
See application file for complete search history.

(56) References Cited

U.S. PATENT DOCUMENTS

| | | | |
|---|---|---|---|
| 2,278,190 A | | 3/1942 | Bodi |
| 2,525,588 A | * | 10/1950 | Cameron et al. ............ 362/119 |
| 2,617,281 A | * | 11/1952 | Jones ........................ 15/257.2 |
| 2,978,731 A | * | 4/1961 | Belluomini ................. 15/257.4 |
| 3,046,817 A | * | 7/1962 | Schwable ................... 408/110 |
| 3,728,027 A | * | 4/1973 | Watanabe .................... 356/13 |
| 3,981,605 A | * | 9/1976 | Wirsing ....................... 408/88 |
| 4,097,176 A | | 6/1978 | Wanner et al. |
| 4,207,953 A | * | 6/1980 | Reibetanz et al. ........... 175/209 |
| 4,251,171 A | * | 2/1981 | Brett ........................... 408/67 |
| 4,372,401 A | | 2/1983 | Fischer |
| 4,923,341 A | * | 5/1990 | Cameron .................... 408/112 |
| 5,090,499 A | * | 2/1992 | Cuneo ......................... 175/209 |
| 5,113,951 A | * | 5/1992 | Houben et al. ................ 173/75 |
| 5,129,467 A | * | 7/1992 | Watanabe et al. ............. 173/75 |
| 5,785,369 A | * | 7/1998 | Ridley et al. ................ 294/1.1 |
| 6,052,860 A | * | 4/2000 | Coxsey ....................... 15/257.2 |
| 6,053,674 A | | 4/2000 | Thompson |
| 6,249,930 B1 | * | 6/2001 | Noggle ....................... 15/257.1 |
| 6,375,395 B1 | * | 4/2002 | Heintzeman ................. 408/16 |
| 6,565,227 B1 | * | 5/2003 | Davis .......................... 362/119 |
| 7,425,109 B2 | * | 9/2008 | Simm et al. ................... 408/67 |
| 2001/0052429 A1 | | 12/2001 | Frenzel et al. |
| 2002/0131267 A1 | * | 9/2002 | Van Osenbruggen ........ 362/109 |

FOREIGN PATENT DOCUMENTS

| | | | |
|---|---|---|---|
| DE | 2803888 A1 | * | 8/1979 |
| DE | 3113496 A1 | * | 10/1982 |
| DE | 33 24 615 | | 5/1984 |
| DE | 3631360 A1 | * | 3/1988 |
| DE | 3801141 A1 | * | 7/1989 |
| DE | 4342484 A1 | * | 4/1995 |
| DE | 103 19 597 | | 12/2004 |
| EP | 0 139 866 | | 5/1985 |
| EP | 0 434 295 | | 6/1991 |
| EP | 1440773 A1 | * | 7/2004 |
| GB | 252588 | | 6/1926 |

(Continued)

*Primary Examiner*—Daniel W Howell
(74) *Attorney, Agent, or Firm*—Michael J. Striker

(57) ABSTRACT

A dust catcher has a contact element configured to catch abraded material that is produced by a power tool on a workpiece, and the contact element includes a handgrip element for holding the contact element on the workpiece.

18 Claims, 3 Drawing Sheets

FOREIGN PATENT DOCUMENTS

| | | | | |
|---|---|---|---|---|
| GB | 2067106 A | * | 7/1981 | |
| GB | 2 096 030 | | 10/1982 | |
| GB | 2096029 A | * | 10/1982 | |
| GB | 2247852 A | * | 3/1992 | |
| GB | 2294653 A | * | 5/1996 | |
| GB | 2366224 A | * | 3/2002 | |
| JP | 63200905 | | 8/1988 | |
| JP | 06270005 A | * | 9/1994 | |
| JP | 09234181 A | * | 9/1997 | |
| JP | 11309104 A | * | 11/1999 | |
| WO | WO 9425219 A1 | * | 11/1994 | |
| WO | 98/52723 | | 11/1998 | |
| WO | WO 2007017681 A2 | * | 2/2007 | |

* cited by examiner

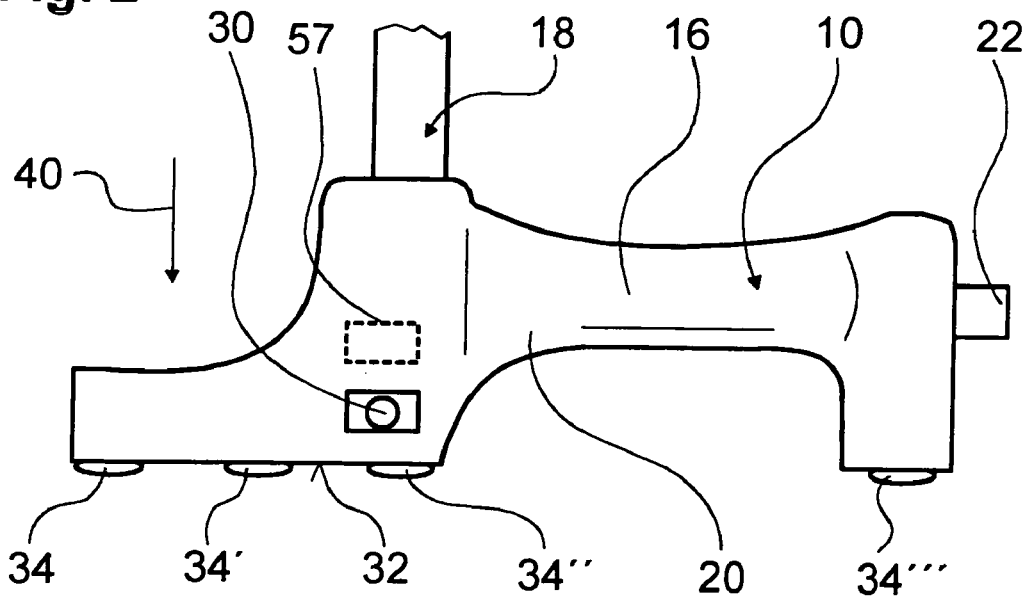
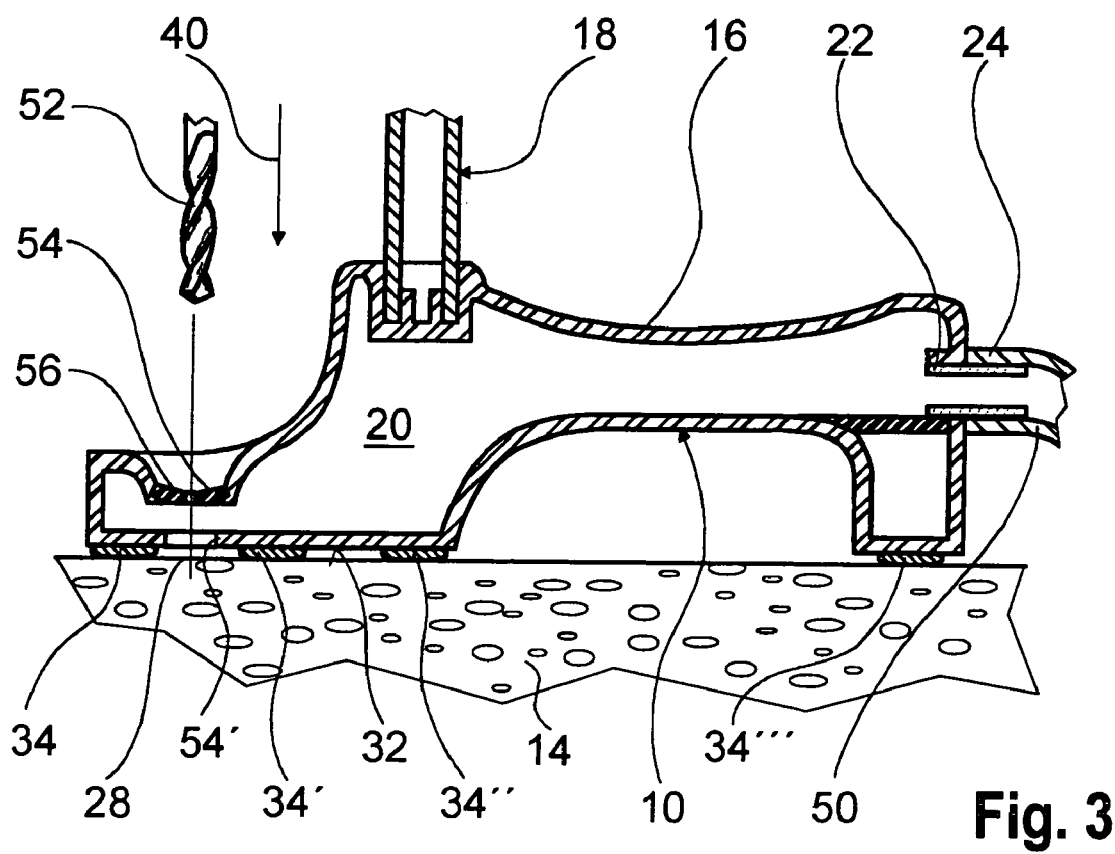

DUST CATCHER

CROSS-REFERENCE TO A RELATED APPLICATION

The invention described and claimed hereinbelow is also described in German Patent Application 102005023186.1, filed on May 19, 2005. This German patent application, whose subject matter is incorporated here by reference, provides the basis for a claim of priority of invention under 35 U.S.C. 119 (a)-(d).

BACKGROUND OF THE INVENTION

The invention is based on a dust catcher.

It has already been proposed to equip a dust catcher with a contact element that is intended for catching abraded material that is produced on a workpiece by a power tool, in particular a power drill. Generic dust catchers are either held on the power tool by a telescoping rod linkage or are intended to be held on the power tool by suction generated by a suction device.

SUMMARY OF THE INVENTION

Accordingly, it is an object of the present invention to provide a dust catcher which is a further improvement of the known catchers.

In keeping with these objects and with others which will become apparent hereinafter, one feature of the present invention resides, briefly stated, in a dust catcher, having a contact element intended to catch abraded material that is produced by a power tool, in particular a power drill, on a workpiece.

It is proposed that the contact element includes a handgrip element for holding the contact element on the workpiece. As a result, it can advantageously be attained that the contact element can be positioned precisely on the workpiece and can be kept at its intended location, particularly even during a work operation.

In this connection, "intended" should also be understood to mean "designed" and "equipped". In principle, a dust catcher according to the invention is conceivable for use in conjunction with any hand-guided power tool that produces abraded material and/or dust at the workpiece. However, a dust catcher of this kind is especially advantageous in conjunction with a power drill or impact power drill that can be operated with one hand, so that the user's other hand can engage the handgrip element and can fix a position of a drill bit precisely on the workpiece. The dust catcher may include a dust container, which is intended for collecting abraded material produced, or it may be part of a dust line through which abraded material produced is collected and extracted by a suction device.

In a further feature of the invention, it is proposed that the contact element is intended for bracing a guide device for guiding the power tool on the workpiece. Because of the advantageous combination of precise positionability of the contact element, or a tool of the power tool, on the workpiece with guidance of the power tool in a working direction, especially exact work can be made possible. If the power tool is embodied as a power drill, the contact element can advantageously have a recess through which a drill bit can be passed.

An especially space-saving and inexpensive construction is attainable if a dust container is integrated into the handgrip element.

If the contact element has at least one connection means for connecting a vacuum cleaner, it can advantageously be attained that in an area where the abraded material is produced, the vacuum cleaner generates an underpressure, by which the abraded material can be reliably vacuumed away. It is also attainable that the vacuum cleaner generates an aspirating force which aspirates the contact element against the workpiece and as a result makes it even more difficult for the contact element to slip on the workpiece.

If the contact element includes a unit which is intended for visualizing a working point of the power tool, then especially exact machining of the workpiece with the power tool can be achieved. For instance, the unit may be embodied as a crosshair or may generate a crosshair, especially advantageously on the workpiece. To that end, the contact element may for instance include a light-emitting diode or a small laser, which projects such a crosshair or similar marking onto the workpiece. If the power tool is embodied as a power drill, the unit may mark a drilling point. If the power tool has a guide device, the unit can advantageously mark a point or an area toward which the guide device guides the power tool.

Especially precise work with the power tool can be made possible if the dust catcher includes a measurement unit for determining a spacing of a working point of the power tool from a characteristic feature of the workpiece. In that case, the characteristic feature may for instance be provided by a wall or ceiling extending perpendicular to the workpiece.

Comfortable work even in inadequate ambient light conditions can be made possible if the dust catcher includes a unit for illuminating a work area of the power tool.

Tipping of the power tool can advantageously be avoided if the contact element includes an inclination sensor unit for detecting a rotary position of the contact element. In the simplest case, the inclination sensor unit can be embodied as a spirit level.

Unintended slipping of the contact element can be at least extensively avoided if one contact face of the contact element is equipped with at least one nonslip liner. As the nonslip liners, bumpy or rubber liners are for instance conceivable.

Grasping the contact element can be made especially comfortable if the handgrip element has a curved surface that is ergonomically adapted to the palm of the hand. The handgrip element may be intended to be grasped by one hand of a user, or it may be embodied as a contact-pressure face for pressing the contact element against the workpiece. Slipping of the contact element can be prevented especially effectively by the user if an edge of the contact element is intended to be overlapped by a user's hand. The contact element can then be effectively held, clamped, between the user's hand and the workpiece.

The invention is also based on a guide device for guiding a power tool, in particular a power drill, in a working direction, having a contact element for placement against a workpiece and having a dust catcher at least partially integrated with the contact element.

It is proposed that the contact element includes a handgrip element for holding the contact element on the workpiece. As a result, especially comfortable fixation of the contact element on the workpiece can be attained.

If a spring mechanism for generating a contact pressure of the contact element on the workpiece, a user can advantageously be supported by the spring mechanism in fixing the contact element against the workpiece.

An advantageously precise definition of a working depth, especially a depth of a drilled hole, is attainable if a depth stop is provided, for limiting a freedom of motion of the power tool in the working direction.

Further advantages will become apparent from the ensuing drawing description. In the drawing, exemplary embodiments of the invention are shown. The drawing, description and

BRIEF DESCRIPTION OF THE DRAWINGS

FIG. 2 shows the dust catcher with the guide device, in a side view;

FIG. 3 shows the dust catcher with the guide device, in a sectional view;

DESCRIPTION OF THE PREFERRED EMBODIMENTS

Figure 1:
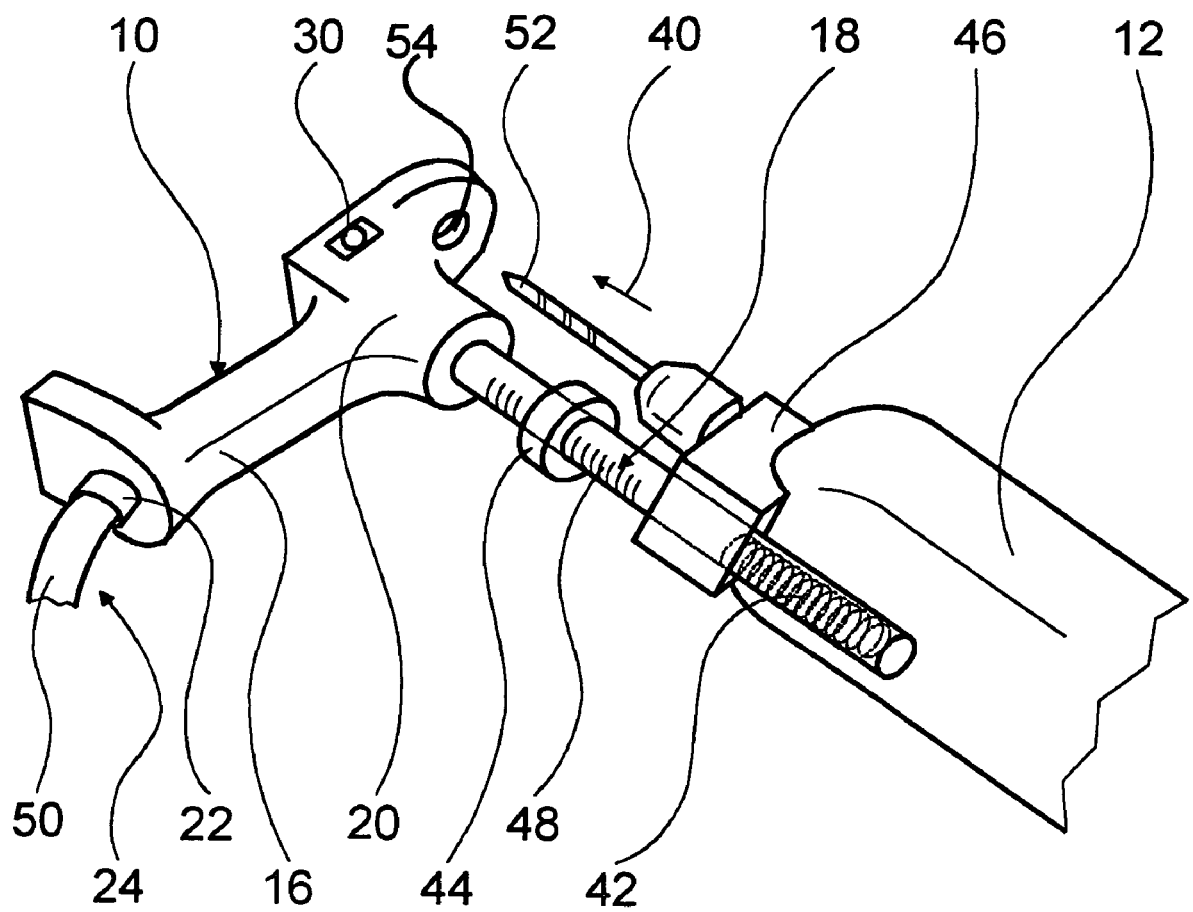
FIG. 1 shows a dust catcher with a guide device and a power drill.

FIG. 1 shows a power tool 12, embodied as a power drill, with a guide device 18 that is intended for guiding the power tool 12 in a working direction 40.

The guide device 18 is secured by a cuff 46 to a clamping neck of the power tool 12 with a diameter of 46 mm. The cuff 46 is connected via a telescoping rod 48 to a contact element 10 of the guide device 18, which is part of a dust catcher for catching abraded material or drilling dust that is produced by the power tool 12 on a workpiece 14 (FIG. 3) during a drilling operation. Simultaneously, the contact element 10 serves to brace the guide device 18 on the workpiece 14.

The telescoping rod 48 includes two individual rods, meshing one inside the other and displaceable counter to one another in the working direction 40, which are engaged by a spring of a spring mechanism 42 which is loaded upon shortening of the telescoping rod 48, so that when the contact element 10 rests on a fixed workpiece 14, a motion of the power tool 12 in the working direction 40 is possible only counter to a spring force of the spring mechanism 42 and with attendant shortening of the telescoping rod 48. As a result, the spring mechanism 42 generates a contact pressure of the contact element 10 against the workpiece 14.

To simplify positioning the contact element 10 on the workpiece 14 and to make slipping of the contact element 10 on the workpiece 14 avoidable, the contact element 10 has a handgrip element 16, for holding the contact element 10 on the workpiece 14, which is intended for fixing a position of the contact element 10 relative to the workpiece 14 during the drilling operation.

The handgrip element 16, like the entire contact element 10, is embodied as a hollow plastic cast body, with a plurality of partial shells, not shown here, connected by screws, and it simultaneously serves as a dust container 20 of the dust catcher. The handgrip element 16 connects an aspiration area of the contact element 10 to a suction extraction area of the contact element 10.

In the suction extraction area, the contact element 10 has a connection means 22, embodied as a metal tube, for connecting a vacuum cleaner 24, represented here only by a vacuuming hose 50, which protrudes out of the plastic body. The vacuuming hose 50 (FIG. 3) can be slipped onto the connection means 22 but can also be closed by a closure cap for brief uses of the power tool 12 that do not produce as much dust, so that the abraded material or drilling dust can collect in the dust container 20 formed by the interior of the contact element 10.

In the aspiration area, the contact element 10 is joined to the telescoping rod 48. The contact element 10 furthermore has two diametrically opposed openings 54, 54', through which a drill bit 52 of the power tool 12 can be passed. An upper opening 54 has a sealing lip 56 of rubber, which causes an underpressure, generated by the vacuum cleaner 24 in the dust container 20, to be at least essentially compensated for by an air stream that flows into the dust container 20 through the second, lower opening 54'. A working point 28 is located at the center of the openings 54, 54' and describes the point on an axis of rotation of the drill bit 52 toward which the guide device 18 guides the drill bit 52 in the working direction 40, and at which this drill bit, during the drilling operation, can be predicted to first engage the workpiece 14. Simultaneously, the working point 28 is a center of a drill hole that is to be made during the drilling operation.

On a lateral edge, the contact element 10 has an inclination sensor unit 30, for detecting a rotary position of the contact element 10, which is embodied as a water-filled glass ampule with a small air bubble, on the order of a spirit level.

Still other embodiments of the invention are conceivable in which a measurement unit 57 is located on and/or can be attached to the contact element 10, the measurement unit being intended to measure the spacings from the working point 28. All types of measurement units that one skilled in the art finds appropriate are conceivable, ranging from a simple ruler or measuring tape to a laser distance measuring device. A measurement unit 57 embodied as a laser distance measuring device is shown in dashed lines in FIG. 2.

The exemplary embodiment with the measurement unit 57 further includes a display, not shown here, intended for showing a spacing, detected by the measurement unit 57, between the working point 28 and a ceiling and/or wall. For instance, if a plurality of drill holes, each with the same spacing from the ceiling, are to be made in a wall, then the measurement unit can advantageously measure this spacing, while with the aid of the inclination sensor unit 30, it can be assured that a perpendicular spacing is what is measured.

The guide device 18 has a ring, embracing the telescoping rod 48, that acts as a depth stop 44. To that end, the first individual rod of the telescoping rod 48 has a set of teeth in which the depth stop 44 can be axially fixed by being twisted, while the second individual rod of the telescoping rod 48 has a fixed stop element, not shown here, which upon a motion of the power tool 12 in the working direction 40 strikes the depth stop 44 and as a result limits a freedom of motion of the power tool 12.

An underside of the contact element 10 forms a contact face 32 of the contact element 10 for contact with the workpiece 14. To make slipping of the contact element 10 on the workpiece 14 at least more difficult, the contact face 32 is equipped with rubber nonslip liners 34-34'''.

Figure 4:
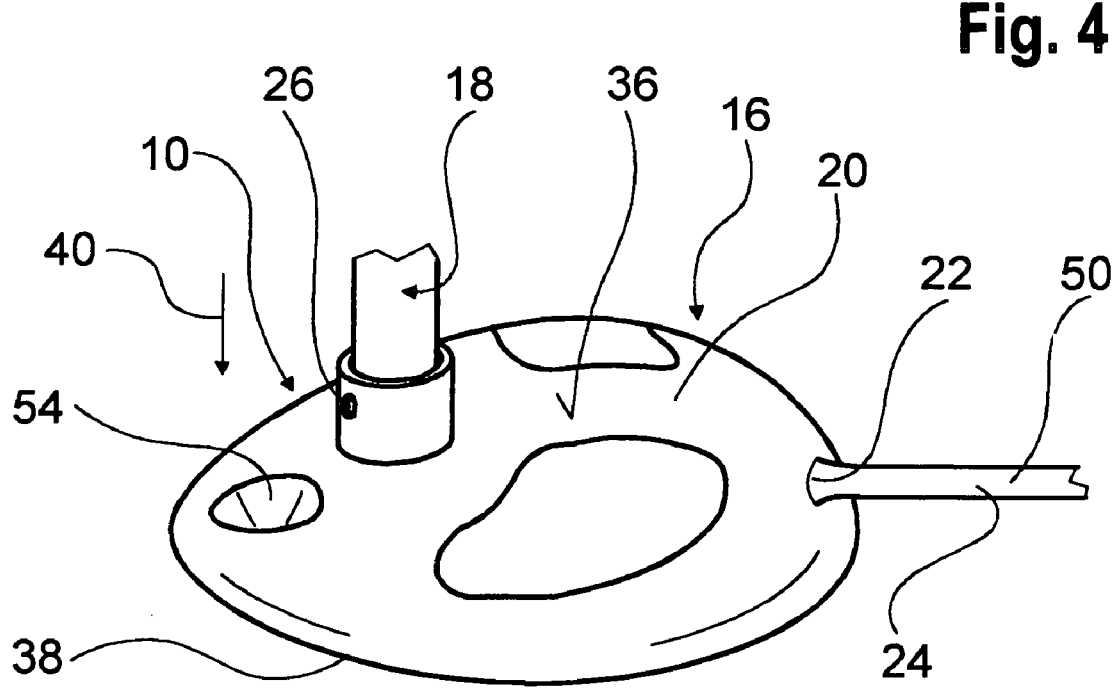
FIG. 4 shows an alternative dust catcher, in an oblique view.
Figure 5:
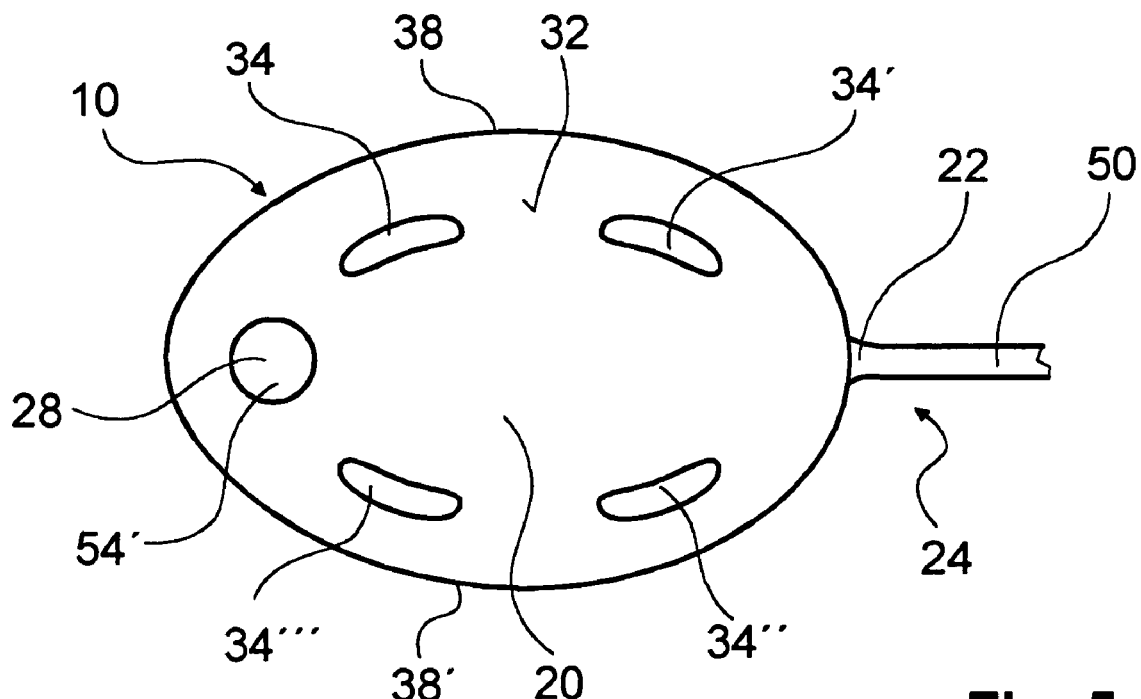
FIG. 5 shows the dust catcher of FIG. 5, in a view from below.

FIGS. 4 and 5 show a further exemplary embodiment of the invention. In the ensuing description, it will essentially be the distinctions from the exemplary embodiment shown in FIGS. 1-3 that are addressed. With regard to characteristics that remain the same, see the description of the exemplary embodiment shown in FIGS. 1-3. Analogous characteristics are each identified by the same reference numerals.

The contact element 10 shown in FIGS. 4 and 5 is shaped essentially like a computer mouse, with a curved surface 36 that is adapted ergonomically in its shape to the palm of a user's hand. A width of the contact element 10 is less than a typical length of a user's hand, and hence the hand can overlap an edge 38, 38', specifically in such a way that in the region of a lower edge 38, the ball of the user's thumb can come to rest on a workpiece, while in the region of an upper edge 38, the user's fingertips can come to rest on the workpiece. The contact element 10, in the region of a receptacle for a guide device 18, furthermore includes a unit 26, embodied as a light-emitting diode with a lens system, that is intended to project an illuminated crosshair onto the workpiece and as a result visualize a working point 28 of a power tool.

The light-emitting diode of the unit 26 is made sufficiently strong to illuminate a work area of the power tool 12, or the surroundings of the working point 28, and to make comfortable work possible even in poor light or in the dark.

It will be understood that each of the elements described above, or two or more together, may also find a useful application in other types of constructions differing from the types described above.

While the invention has been illustrated and described as embodied in a dusta catcher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A dust catcher comprising a contact element configured to catch abraded material that is produced by a power tool during operation on a workpiece, said contact element comprising a guide device for guiding the power tool for operation on the workpiece, the contact element forming a housing that encloses a dust container and having an aspiration area and a suction extraction area, both of the aspiration area and suction extraction areas having contact surfaces for resting upon the workpiece, and a hand grip connecting the aspiration area and the suction extraction area, the hand grip forming a gap with the workpiece, the gap being of a sufficient size for an operator's finger to wrap around the handgrip.

2. A dust catcher comprising a contact element configured to catch abraded material that is produced by a power tool during operation on a workpiece, said contact element comprising a guide device for guiding the power tool for operation on the workpiece, the contact element forming a housing that encloses a dust container, and comprises an upper opening and a lower opening through which a drill bit of said power tool is passed, the contact element having an aspiration area adjacent the upper and lower openings and a suction extraction area, both of the aspiration area and suction extraction areas having contact surfaces for resting upon the workpiece, and a hand grip connecting the aspiration area and the suction extraction area, the hand grip forming a gap with the workpiece, the gap being of a sufficient size for an operator's finger to wrap around the handgrip.

3. The dust catcher as set forth in claim 1, wherein said contact element further includes a, telescoping rod and a ring embracing the telescoping rod that acts as a depth stop.

4. A dust catcher as defined in claim 1, wherein said contact element has at least one connection means for connecting a vacuum cleaner.

5. A dust catcher as defined in claim 1, wherein said contact element includes a unit which is configured for visualizing a working point of the power tool.

6. A dust catcher as defined in claim 1; and further comprising a measurement unit for determining a spacing of a working point of the power tool from a characteristic feature of the workpiece.

7. A dust catcher as defined in claim 2, wherein the upper opening comprises a sealing lip of rubber.

8. A dust catcher as defined in claim 1, wherein said contact element includes an inclination sensor unit for detecting a rotary position of said contact element.

9. A dust catcher as defined in claim 1, wherein said contact element has one contact face provided with at least one nonslip liner.

10. A dust catcher as defined in claim 1, wherein said handgrip element has a curved surface ergonomically adapted to a palm of a hand.

11. A dust catcher as defined in claim 1, wherein said contact element has an edge configured to be overlapped by a user's hand.

12. A dust catcher as defined in claim 2, wherein the upper opening and the lower opening each have a diameter large enough for said drill bit to pass.

13. A guide device as defined in claim 1; and further comprising a spring mechanism for generating a contact pressure of said contact element on the workpiece.

14. A guide device as defined in claim 1; and further comprising a depth stop for limiting a freedom of motion of the power tool in a working direction.

15. The dust catcher as defined in claim 6, wherein the measurement unit is embodied as a laser distance measuring device.

16. The dust catcher as defined in claim 9, wherein the at least one nonslip liner comprises several rubber cushions.

17. The dust catcher as defined in claim 7, wherein the sealing lip of rubber of the upper opening is configured to cause an underpressure to draw air into the lower opening.

18. The dust catcher as defined in claim 1; and further comprising a unit for illuminating a work area of the power tool embodied as a light-emitting diode with a lens system.

* * * * *